(No Model.)
G. T. & M. H. BRADLEY.
PUZZLE.
No. 492,605.  Patented Feb. 28, 1893.
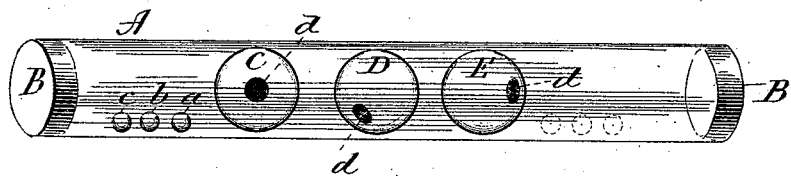
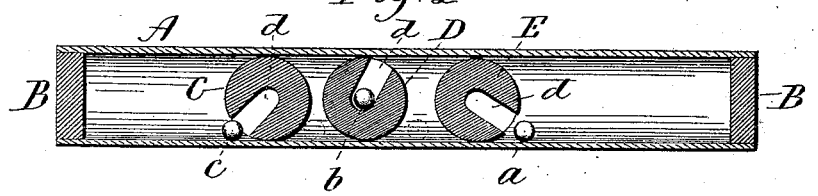
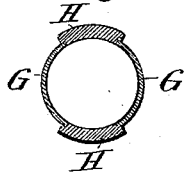
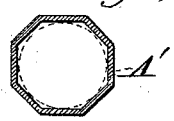
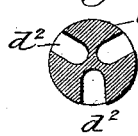
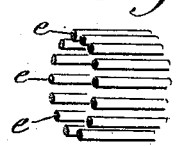
Witnesses  
J. H. Shumway  
Lillian D. Kelsey
George T. Bradley  
Milton H. Bradley  
By atty Earle Seymour  
Inventors

UNITED STATES PATENT OFFICE.

GEORGE T. BRADLEY AND MILTON H. BRADLEY, OF NEW HAVEN, CONNECTICUT.

PUZZLE.

SPECIFICATION forming part of Letters Patent No. 492,605, dated February 28, 1893.

Application filed September 21, 1892. Serial No. 446,364. (No model.)

*To all whom it may concern:*

Be it known that we, GEORGE T. BRADLEY and MILTON H. BRADLEY, of New Haven, in the county of New Haven and State of Connecticut, have invented a new Improvement in Puzzles; and we do hereby declare the following, when taken in connection with accompanying drawings and the letters of reference marked thereon, to be a full, clear, and exact description of the same, and which said drawings constitute part of this specification, and represent, in—

Figure 1, a perspective view of the puzzle complete; Fig. 2, longitudinal central section of the same; Figs. 3 and 4, modifications in the construction of the balls; Figs. 5, 6, and 7, modifications in the construction of the tube.

This invention relates to that class of puzzles in which balls are arranged within a chamber exposed to view, free for movement therein, the puzzle depending upon certain arrangement or movement of the balls within the chamber, such movement being produced by gravity, or equivalent force indirectly applied thereto, and the invention consists of a tubular chamber, its interior exposed to view from the outside, with one or more balls arranged therein, of a diameter slightly less than the internal diameter of the chamber, and one or more smaller balls arranged in the said chamber, the said larger balls having a cavity open to the circumference, the said opening into the cavity corresponding substantially to the size of the smaller balls, and as and for the purpose more fully hereinafter described.

A, represents a tube, which is preferably made from glass, and is closed at each end by heads B, to form a close chamber. Within the chamber one or more balls are arranged, here represented as three, C, D and E representing such balls. The diameter of the said balls is slightly less than the diameter of the tubular chamber, and so that the balls may roll freely within the chamber. Within the chamber one or more smaller balls, as $a\ b\ c$, are arranged, and each of the larger balls is constructed with a cavity $d$, open to the outside of the balls, each of the cavity openings slightly larger than the smaller balls $a, b, c$, and so that the said smaller balls may enter the said cavities. This completes the puzzle.

To work out the puzzle, it is required that the one or more balls which stand in the chamber at one side of the larger balls, as seen in Fig. 1, shall be transferred to the opposite side of the said larger balls, as indicated in broken lines in Fig. 1, and this is accomplished by taking the tube in the hand, and by the movement of the tube so cause the first ball to present its cavity to receive one of the smaller balls, as $c$, in Fig. 2, which entering the cavity $d$, of that ball, may, by the rolling of the said ball C, pass to the opposite side of that ball and be discharged into the chamber between the first ball and the second ball, and as indicated in broken lines in Fig. 2, then in like manner the ball $c$, is brought into the cavity of the second ball, to be discharged upon the opposite side of that second ball, as indicated in broken lines Fig. 2, then in like manner the cavity of the third ball receives the small ball, and finally discharges it into the other end of the chamber, as seen in Fig. 2, $c$, representing a ball as entering the cavity of the first large ball C, $b$ representing the second smaller ball as in the cavity of the second ball D, and being transferred, and the ball $a$, as just escaping from the cavity of the third ball E. The balls being each free and independent of the other, readily move within the tubular chamber by tipping the tube so as to produce the movement by the action of gravity, or the movement may be accomplished by shaking the tube, such movement changing the position of the balls until they present themselves for the transfer as before described. The freedom of the balls makes it extremely difficult to locate one of the smaller balls in the cavity of the larger ball so as to be transferred by that larger ball from one side of the said larger ball to the chamber on the opposite side of the same ball.

While preferring to construct the larger balls with a cavity open to one side only, the balls may have the cavity extend diametrically through them, and so as to open upon the opposite side, as seen in Fig. 3, C' representing the ball, and $d'$ the opening diametrically through it; this construction will make the transfer of the smaller balls easier than when the cavity opens from one side only. Or, the balls may be constructed with two or more cavities, as seen in Fig. 4, $C^2$ representing the ball and $d^2$ representing the cavities therein, each cavity being adapted to receive a smaller ball.

The tube is best made from glass, as it prevents the possibility of any direct application of force to the balls, yet the tube may be made as a cage, by a succession of wires $e$, as seen in Fig. 5, the spaces between the wires being so much less than the smaller balls as to prevent the possibility of their escape. This will give the necessary exposure to the balls for the working out of the puzzle. Or, the tube may be made partially transparent by the introduction of glass panels, as seen in Fig. 6, G G, representing the glass panels, and H H, opaque sections, these illustrations being sufficient to indicate that the tube may be constructed from various materials. The tube is preferably of cylindrical shape, but it may be polygonal, as seen in Fig. 7, A' representing the tube or other desirable shape, it only being essential, so far as its shape is concerned, that the larger balls shall so fill the tube as to prevent the possibility of the smaller balls escaping from one side of the larger balls to the opposite side, except by means of the cavities in the said larger balls.

The glass tube is preferable, because of its entire transparency, the neat appearance which may be given to the article, and for its small cost, yet as before stated, it is not essential that the tube shall be made from glass.

We claim—

The herein described puzzle, consisting of a tube closed at both ends, the interior of the tube exposed to view through its surface, combined with one or more balls within said tube, the said balls so much less in diameter than the internal diameter of the tube as to permit the free movement of the balls longitudinally within the tube, and one or more smaller balls arranged within the said tube, the said larger balls constructed with a cavity opening to the surface of the ball, the said opening slightly larger than the smaller balls, and the said cavities adapted to receive the smaller balls through said opening, substantially as described.

In testimony whereof we have signed this specification in the presence of two subscribing witnesses.

GEORGE T. BRADLEY.
MILTON H. BRADLEY.

Witnesses:
FRED C. EARLE,
LILLIAN D. KELSEY.